(12) United States Patent
Egan

(10) Patent No.: US 12,366,979 B2
(45) Date of Patent: Jul. 22, 2025

(54) MANAGING A MEMORY SUB-SYSTEM BASED ON COMPOSITE TEMPERATURE

(71) Applicant: Micron Technology, Inc., Boise, ID (US)

(72) Inventor: Curtis W. Egan, Brighton, CO (US)

(73) Assignee: Micron Technology, Inc., Boise, ID (US)

( * ) Notice: Subject to any disclaimer, the term of this patent is extended or adjusted under 35 U.S.C. 154(b) by 746 days.

(21) Appl. No.: 17/450,233

(22) Filed: Oct. 7, 2021

(65) Prior Publication Data

US 2023/0110664 A1 Apr. 13, 2023

(51) Int. Cl.
| | |
|---|---|
| *G01K 1/26* | (2006.01) |
| *G01K 1/02* | (2021.01) |
| *G01K 3/00* | (2006.01) |
| *G01K 7/22* | (2006.01) |
| *G05B 15/02* | (2006.01) |
| *G06F 3/06* | (2006.01) |

(52) U.S. Cl.
CPC .......... *G06F 3/0632* (2013.01); *G01K 1/026* (2013.01); *G01K 3/005* (2013.01); *G01K 7/22* (2013.01); *G05B 15/02* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | |
|---|---|---|
| 2008/0162388 A1 | 7/2008 | de la Guardia et al. |
| 2020/0117254 A1 | 4/2020 | Lin et al. |
| 2020/0174535 A1 | 6/2020 | Holmstrom et al. |
| 2020/0301490 A1 | 9/2020 | Thomas et al. |
| 2020/0379525 A1* | 12/2020 | Luo .......................... G06F 1/206 |

OTHER PUBLICATIONS

PCT Notification of Transmittal of the International Search Report and the Written Opinion of the International Searching Authority for PCT Application No. PCT/US2022/045933, mailed Feb. 1, 2023, 9 pages.

\* cited by examiner

*Primary Examiner* — Erica S Lin
(74) *Attorney, Agent, or Firm* — Lowenstein Sandler LLP

(57) ABSTRACT

A plurality of device temperature values that are each indicative of a temperature at a respective device of a plurality of devices of a system is identified. A respective composite temperature threshold ratio is determined for each device of the plurality of devices. A respective normalization value based on the respective composite temperature threshold ratio and the respective device temperature value is determined for each device of the plurality of devices. A largest normalization value of the plurality of devices is determined. A composite temperature of the system based on the largest normalization value of the plurality of devices is set.

20 Claims, 5 Drawing Sheets

MANAGING A MEMORY SUB-SYSTEM BASED ON COMPOSITE TEMPERATURE

TECHNICAL FIELD

Embodiments of the disclosure relate generally to memory sub-systems, and more specifically, relate to managing a memory sub-system based on composite temperature.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure.

DETAILED DESCRIPTION

Figure 1:
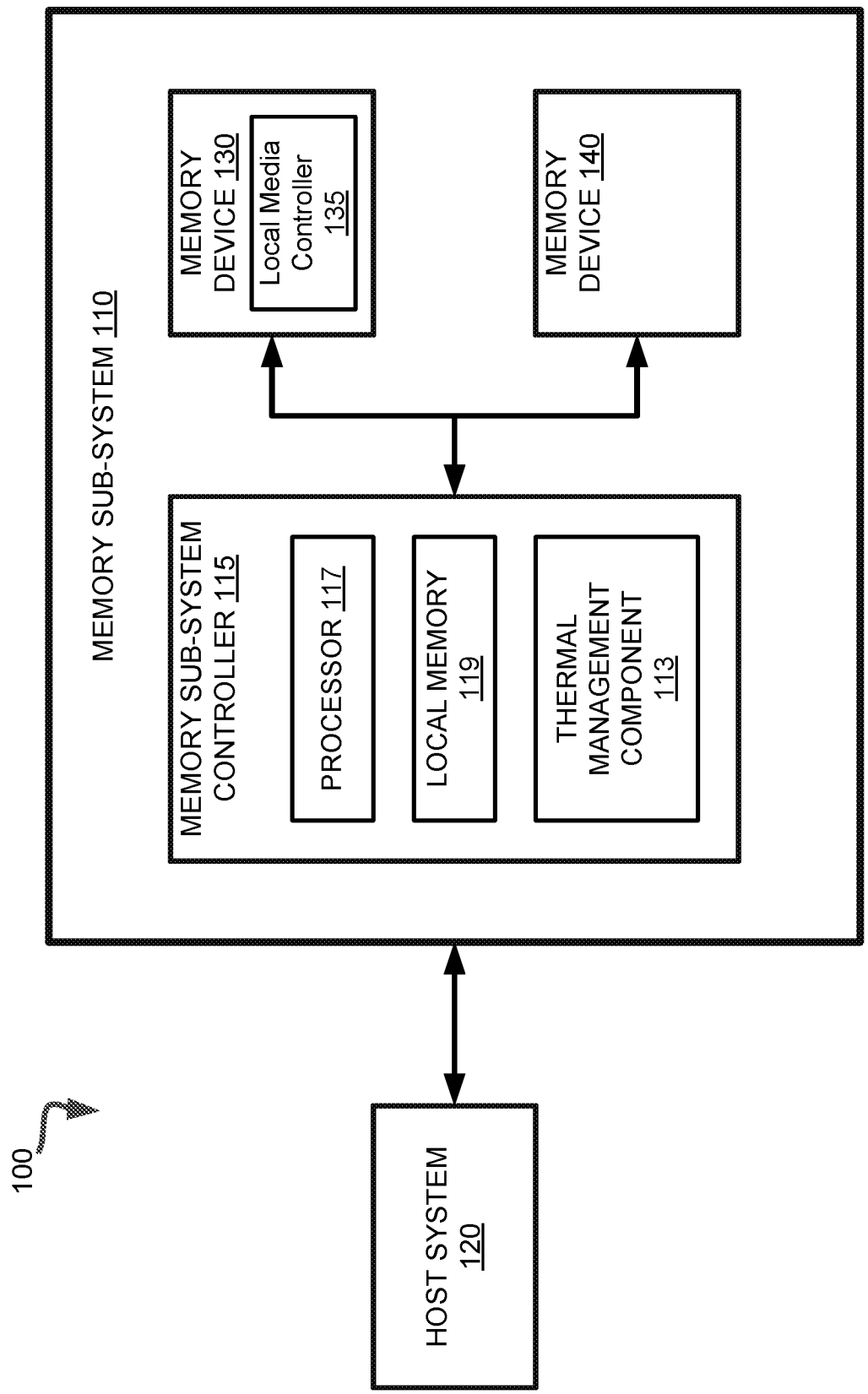
FIG. 1 illustrates an example computing environment that includes a memory sub-system, in accordance with some embodiments of the disclosure.

Embodiments of the disclosure are directed to providing a composite temperature for managing a memory sub-system, such as a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components (e.g., devices), such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by not-and (NAND) type flash memory devices. Other examples of non-volatile memory devices are described below in conjunction with FIG. 1. A non-volatile memory device is one or more packages of one or more dice. Each die can consist of one or more planes. Planes can be groups into logic units (LUN). For some types of non-volatile memory devices (e.g., NAND devices), each plane includes a set of erasable blocks.

In some memory sub-systems, a temperature sensor (e.g., thermistor) is built into the memory sub-system to measure the temperature of the memory sub-system. When the measured temperature at the discrete temperature sensor reaches a particular temperature, the memory sub-system can perform some thermal throttling or thermal shutdown operation. Using a single sensor often does not accurately measure the temperature variations across the system, which can lead to inadequate thermal protection for the memory sub-system. Thermal throttling can refer to a process or operations taken by a system or device to help cool down the system or device in an effort to prevent thermal stress from degrading the system or device. Thermal shutdown can refer to a process or operation taken by a system or device to prevent the system or device from exceeding a critical temperature that can permanently damage the system or device.

Depending on the embodiment, appropriate thermal throttling thresholds for different feedback devices (e.g., memory controller, non-volatile memory, or volatile memory) of the memory sub-system are implemented. Each device can be associated with a corresponding thermal throttling threshold. Multiple device temperature values that are each indicative of a temperature can be received from a single device or multiple devices are aggregated and can be interpreted as a single device temperature value (e.g., composite temperature). Composite temperature refers to a value corresponding to a temperature that represents the current composite temperature of the aggregated devices (e.g., controller and memory devices). In some embodiments, the composite temperatures is calculated based on an offset of the aggregate temperature or an average of temperature of the controller and memory devices. In some embodiments, the composite temperature is calculated based on a root means square (e.g., RMS fit) of the aggregated devices. Accordingly, the composite temperature typically does not represent an actual temperature value of any device (e.g., controller or memory devices) of the memory sub-system.

Aspects of the present disclosure address the above and other deficiencies by providing a composite temperature that reflects a temperature of at least one of the plurality of devices (e.g., controller and memory devices) in the memory sub-system.

Advantages of the present disclosure include, but are not limited to, having a more accurate temperature that represent the status of at least one device of the memory sub-system requiring the most attention.

Memory sub-systems are described as examples of systems that can implement aspects of the disclosure for purposes of illustration, rather than limitation. Other systems, such as computer system or server systems, can also implement aspects of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMN), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMN controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a thermal management component 113 that can determine a composite temperature for a memory sub-system and manage the memory sub-system based on the determined composite temperature. In some embodiments, the memory sub-system controller 115 includes at least a portion of the thermal management component 113. In some embodiments, the thermal management component 113 is part of the host system 110, an application, or an operating system. In other embodiments, local media controller 135 includes at least a portion of thermal management component 113 and is configured to perform the functionality described herein.

In some embodiments, thermal management component 113 can identify multiple device temperature values that are each indicative of a temperature at a respective device (e.g., controller 115, one or more memory devices 130, and/or one or memory devices 140) of the memory sub-system 110. The identified device temperature value is derived from a plurality of temperature samples obtained from a temperature measurement device built-in on the respective device. For each device, the thermal management component 113 can calculate a respective composite temperature threshold ratio. The composite temperature threshold ratio is the ratio of a predetermined critical composite temperature and a shutdown temperature threshold for the respective device. Based on the respective composite temperature threshold ratio, the thermal management component 113 can determine a respective relative composite temperature value (e.g., normalization value) for each of the devices. The respective relative composite temperature value (e.g., normalization value) refers to normalizing the temperature value of each device with the relative temperature of the system. Upon determining the respective relative composite temperature value for each of the devices, the thermal management component 113 determines the largest relative composite temperature value among the relative composite temperature values of the plurality of devices. Thermal management component 113 sets a composite temperature of the memory sub-system based on the largest relative composite temperature value. Further detail with regards to the operation of the thermal management component 113 are described below.

Figure 2:
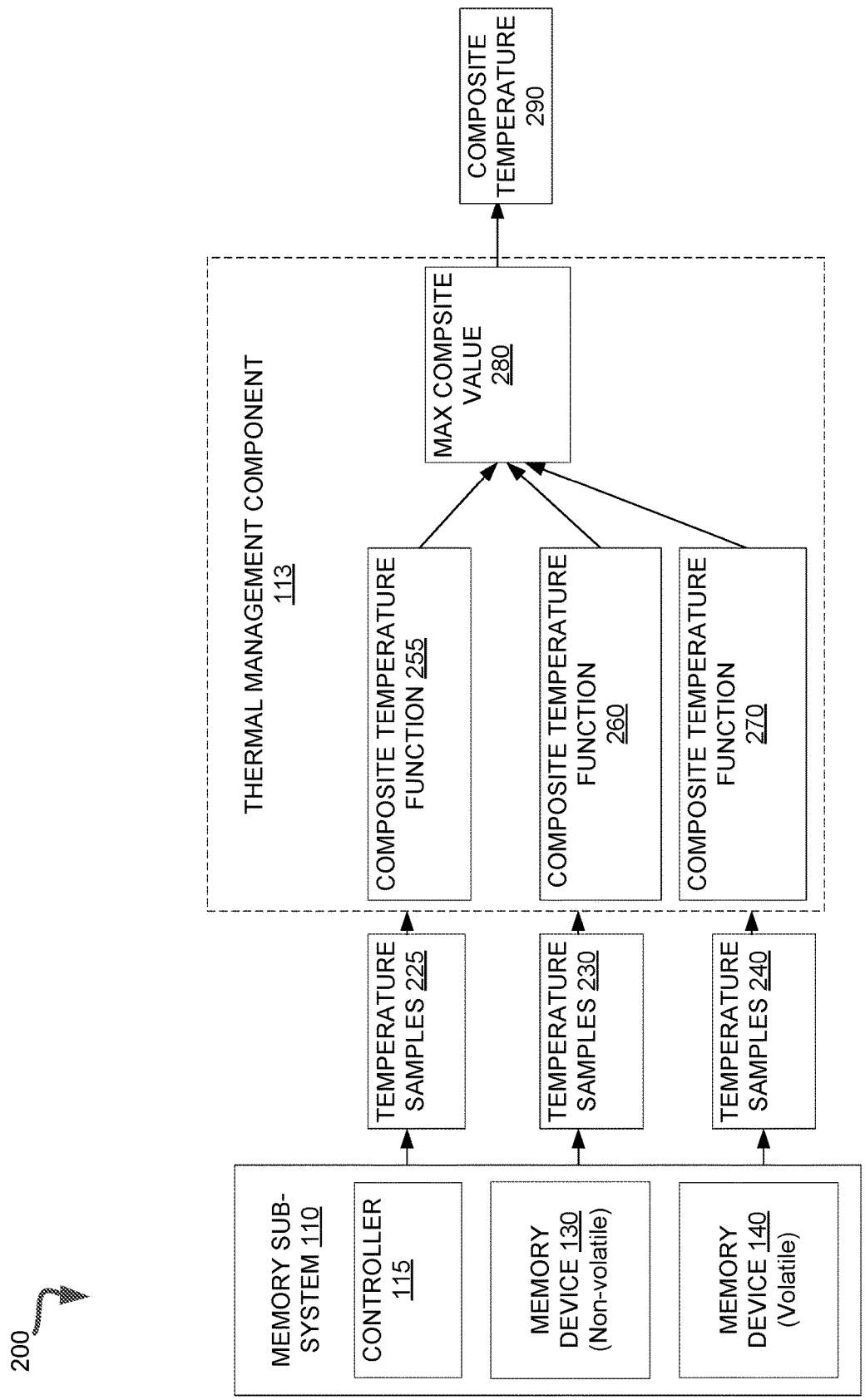
FIG. 2 is a diagram illustrating managing a memory sub-system based on composite temperature, in accordance with some embodiments of the disclosure.

FIG. 2 is a diagram illustrating control operations to providing a composite temperature for managing a memory sub-system based on the composite temperature, in accordance with embodiments of the disclosure. Diagram 200 illustrates memory sub-system 110 and thermal management component 113. Thermal manager component 113 of FIG. 1 can execute the control operations, unless otherwise described.

In some embodiments, device temperature samples from one or more devices, such as controller 115, memory device(s) 130, and/or memory device(s) 140, of the memory sub-system 110 can be sent to thermal manager component 113. In some embodiments, a direct temperature measurement to obtain the device measurement samples can be made by at least one of the devices of the memory sub-system 110. A direct temperature measurement can be a measurement that is made on-chip at the particular device. For example, the controller 115, the memory device(s) 130, and/or the memory device(s) 140 can each include an on-chip temperature measurement device that measures the temperature samples (e.g., temperature samples 225, 230, and 240) at the controller 115, the memory device(s) 130, and/or the memory device(s) 140, respectively.

In some embodiments, the temperature samples from multiple devices of the memory sub-system 110 (e.g., temperature samples 225, 230, and 240) are received by thermal manager component 113. Each of the temperature samples 225, 230, and 240 are used to determine a respective device temperature value. Temperature samples 225, 230, and 240 can be received multiple times per second, for example. The device temperature values are indicative of the temperature at a respective device of the memory sub-system 110. In an example, a device temperature value can be a temperature value of a device in degrees Celsius. In another example, a device temperature value can be determined for the controller 115, another device temperature value can be determined for the memory device(s) 130, and still another device temperature value can be determined for the memory device(s) 140. For purposes of illustration, rather than limitation, a single device temperature value for the memory device(s) 130 and a single device temperature value for memory device(s) 140 is described. In other embodiments, a device temperature value can be determined for a single memory device 130 or 140, for a sub-group of memory devices 130 or 140, for all the memory devices 130 or 140, or a combination thereof. In some embodiments, multiple device temperature values can be determined for different memory devices 130 or 140 or sub-groups of memory devices 130 or 140.

In some embodiments, the device temperature values for each of the one or more devices can be determined from temperature samples 225, 230, and 240 using one or more techniques. In some embodiments, a particular device temperature value can be determined using multiple device temperature samples. In some embodiments, a moving average filter (e.g. finite impulse response (FIR) filter) can use the device temperature samples from the various devices of the memory sub-system 110 to determine respective device temperature values for the devices of the memory sub-system 110. In other embodiments, one or more of the highest device temperature samples and/or one or more the lowest device temperature samples can be removed and an average of the remaining samples (e.g., moving average) can be used to determine respective device temperature values. In some embodiments, temperature samples can be filtered to remove spurious temperature samples, remove undesirable temperature samples above or below predetermined values or remove undesirable temperature samples that are outside a given range of acceptable values.

In some embodiments, each composite temperature function 255, 260, and 270 of the thermal management component 113 receives a device temperature value from a device (e.g., controller, memory device(s) 130, and memory device(s) 140, respectively) to determine a relative composite temperature value. Each composite temperature function 255, 260, and 270 is based on the respective device temperature value and the composite threshold ratio (i.e., the composite temperature function 255, 260, and 270 is the respective device temperature value multiplied by the composite threshold ratio). The composite threshold ratio is the ratio of the thermal shutdown threshold of the respective device and the critical composite temperature.

The critical composite temperature (e.g., 85° C.) can be defined by industry standards, such as, NVM Express (NVMe) which is an open, logical-device interface specification for accessing a computer's non-volatile storage media usually attached via PCI Express (PCIe) bus. The thermal shutdown threshold refers to a temperature at which a thermal shutdown operation is executed to discontinue input and output (I/O) operations of a device. For example, controller 115 may have a thermal shutdown threshold of 110° C., memory device(s) 130 may have a thermal shutdown threshold of 95° C., and memory device(s) 140 may have a thermal shutdown threshold of 85° C.

For example, the composite threshold ratio of composite temperature function 255 which corresponds to controller 115 is the critical composite temperature (e.g., 85° C.) over the thermal shutdown threshold of controller 115 (e.g., 110° C.), the composite threshold ratio of composite temperature 260 which corresponds to memory device(s) 130 is the critical composite temperature (e.g., 85° C.) over the thermal shutdown threshold of memory device(s) 130 (e.g., 95° C.), and the composite threshold ratio of composite temperature function 270 which corresponds to memory device(s) 140 is the critical composite temperature (e.g., 85° C.) over the thermal shutdown threshold of memory device(s) 140 (e.g., 85° C.). Depending on the embodiment, the critical composite temperature may be any suitable temperature to be used as a normalizing value.

Accordingly, to calculate the relative composite temperature value for each device, the thermal management component 113 multiplies the respective device temperature value, derived from the respective temperature samples, with the composite threshold ratio, derived from the critical composite temperature and the respective thermal shutdown threshold. Once each of the composite temperature functions 255, 260, and 270 returns the relative composite temperature value of each of the devices, the thermal management component 113 determines which of the relative composite temperature value is the largest among the devices and provides the largest relative composite temperature value as the composite temperature for the memory sub-system 110.

Figure 3:
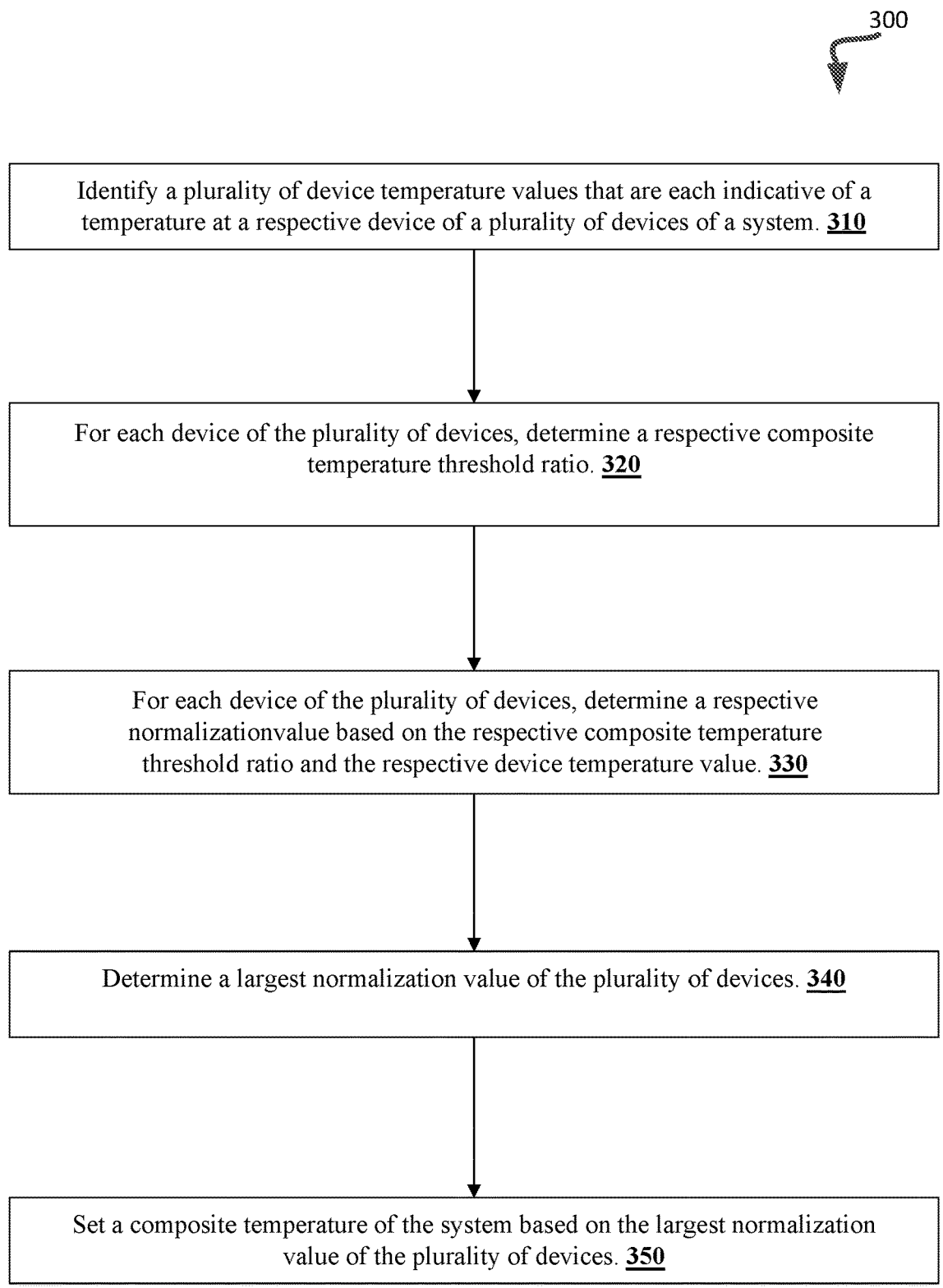
FIG. 3 is a flow diagram of an example method for providing a composite temperature for managing a memory sub-system based on the composite temperature, in accordance with some embodiments of the disclosure.

FIG. 3 is a flow diagram of an example method 300 to provide a composite temperature for managing a memory sub-system based on the composite temperature, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the thermal management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic identifies a plurality of device temperature values that are each indicative of a temperature at a respective device of a plurality of devices of a system. The plurality of device includes a controller, a volatile memory device, and a non-volatile memory device.

At operation 320, for each device of the plurality of devices, the processing logic determines a respective composite temperature threshold ratio. The respective composite temperature threshold ratio is based on a respective composite temperature threshold and a thermal shutdown threshold of the respective device. The respective composite temperature threshold is based on a predetermined temperature in which input/output (I/O) operations of the memory sub-system is discontinued. As described previously, the predetermined temperature refers to the critical composite temperature. As described previously, the thermal shutdown threshold is based on a temperature at which a thermal shutdown operation is executed to discontinue input/output (I/O) operations of the respective device.

At operation 330, for each device of the plurality of devices, the processing logic determines a respective relative composite temperature value based on the respective composite temperature threshold ratio and the respective device temperature value. In some embodiments, to determine the respective relative composite temperature value, the processing logic multiplies the respective composite temperature threshold ratio and the respective temperature value. Responsive to determining the relative composite temperature value of the plurality of devices, at operation 340, the processing logic determines a largest relative composite temperature value of the plurality of devices. The largest relative composite temperature value of the plurality of devices is set as a composite temperature of the system by the processing logic, at operation 350. In some embodiments, the processing logic controls, based on the composite value, an environmental condition of the system by adjusting a fan speed of the system.

Figure 4:
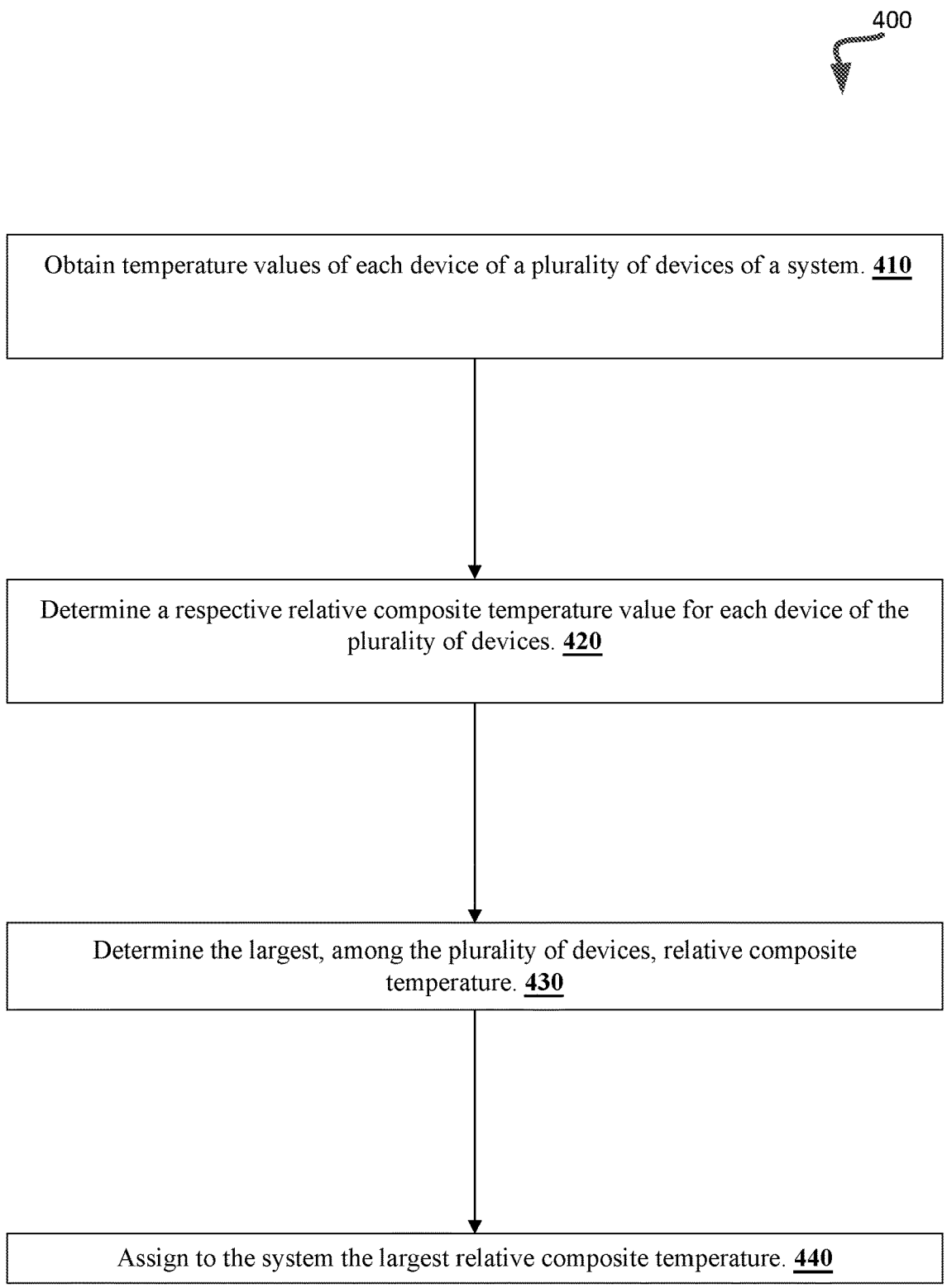
FIG. 4 is a flow diagram of an example method for providing a composite temperature for managing a memory sub-system based on the composite temperature, in accordance with some embodiments of the disclosure.

FIG. 4 is a flow diagram of an example method 400 to provide a composite temperature for managing a memory sub-system based on the composite temperature, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the thermal management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic obtains temperature values of each device of a plurality of devices of a system. As described previously, identified temperature value is derived from a plurality of temperature samples obtained from a temperature measurement device built-in on the respective device.

At operation 420, the processing logic determines a respective relative composite temperature value for each device of the plurality of devices. To determine the relative composite temperature value for each of the plurality of device, the processing logic multiplies a critical composite temperature threshold ratio of the respective device of the plurality of devices and the temperature value of the respective device of the plurality of devices.

The critical composite temperature threshold ratio is based on a critical composite temperature threshold and a thermal shutdown threshold of the respective device. As described previously, the critical composite temperature threshold is based on a predetermined temperature in which input/output (I/O) operations of the memory sub-system is discontinued. The thermal shutdown threshold is based on a temperature at which a thermal shutdown operation is executed to discontinue input/output (I/O) operations of the respective device.

At operation 430, the processing logic determines the largest, among the plurality of devices, relative composite temperature. Responsive to determining the largest relative composite temperature, the processing logic, at operation 440, the processing logic assigns to the system the largest relative composite temperature as a composite value.

In some embodiments, the processing logic controls, based on the composite value, an environmental condition of the system by adjusting a fan speed of the system.

Figure 5:
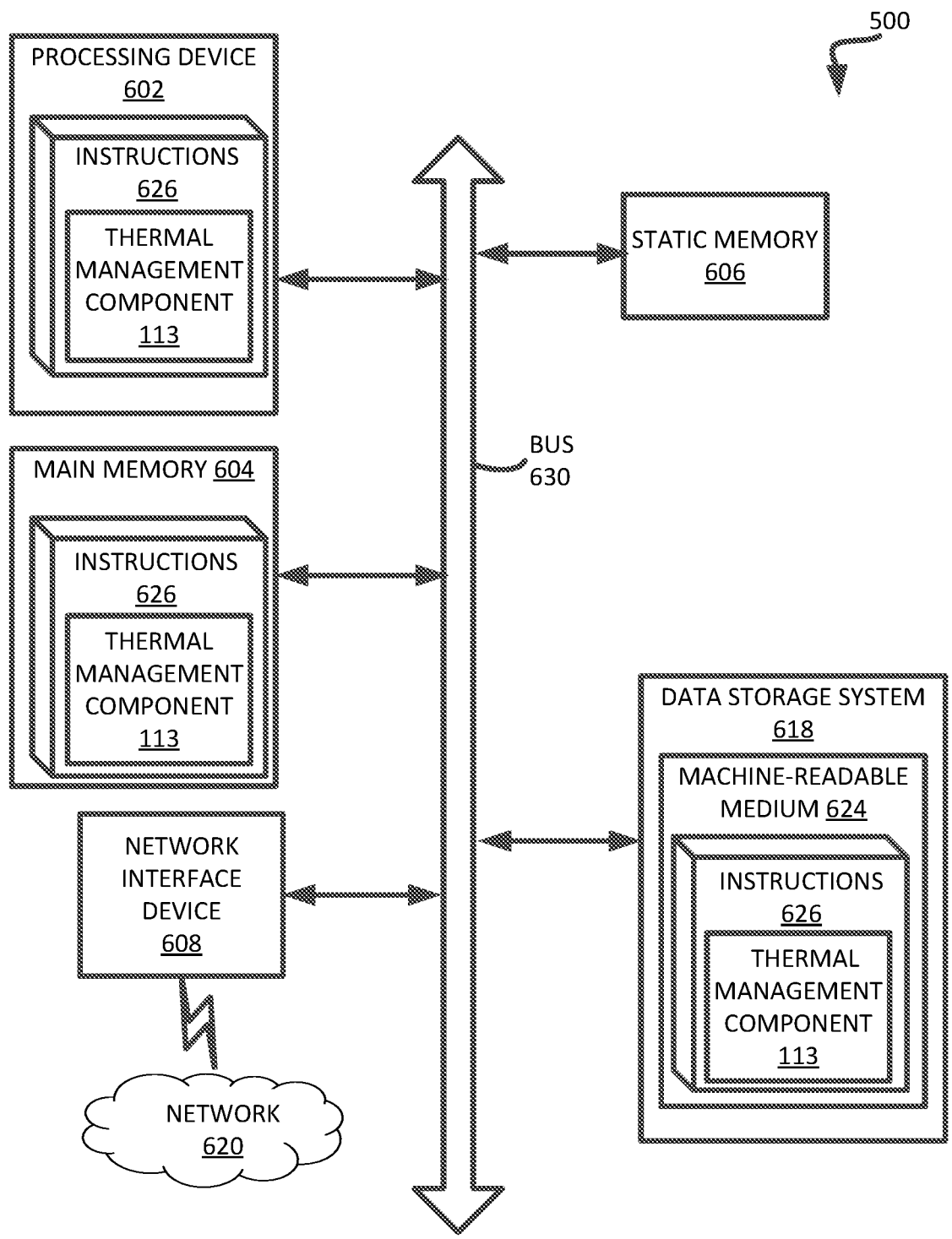
FIG. 5 illustrates an example machine of a computer system within which a set of instructions, for causing the machine to perform any one or more of the methodologies discussed herein, can be executed.

FIG. 5 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the thermal management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a media management component (e.g., the thermal management component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   identifying a plurality of device temperature values that are each indicative of a temperature at a respective device of a plurality of devices of a system;
   determining, a normalizing value for each device of the plurality of devices based on a corresponding composite temperature threshold ratio; and
   determining a largest normalized value among the plurality of devices to be set as a composite temperature of the system.

2. The method of claim 1, wherein the normalized value is equal to the respective device temperature multiplied by the normalizing value over the maximum temperature of the respective device.

3. The method of claim 1, wherein the normalizing value is based on a predetermined temperature in which input/output (I/O) operations of a memory sub-system is discontinued.

4. The method of claim 1, wherein the maximum temperature of the respective device is based on a temperature at which a thermal shutdown operation is executed to discontinue I/O operations of the respective device.

5. The method of claim 1, wherein each of the identified plurality of device temperature values that are each indicative of the temperature at the respective device of the plurality of devices are based on a plurality of temperature samples obtained from a temperature measurement device built-in on the respective device.

6. The method of claim 1, further comprising:
   controlling, based on the composite temperature of the system, an environmental condition of the system by adjusting a fan speed of the system.

7. The method of claim 1, wherein the plurality of device includes a controller, a volatile memory device, and a non-volatile memory device.

8. A system comprising:
   a plurality of devices; and
   a processing device, coupled with the plurality of devices, to perform operations comprising:
   identifying a plurality of device temperature values that are each indicative of a temperature at a respective device of the plurality of devices of a system;
   a normalizing value for each device of the plurality of devices based on a corresponding composite temperature threshold ratio; and
   determining a largest normalized value among the plurality of devices to be set as a composite temperature of the system.

9. The system of claim 8, wherein the normalized value is equal to the respective device temperature multiplied by the normalizing value over the maximum temperature of the respective device.

10. The system of claim 8, wherein the normalizing value is based on a predetermined temperature in which input/output (I/O) operations of a memory sub-system is discontinued.

11. The system of claim 8, wherein the maximum temperature of the respective device is based on a temperature at which a thermal shutdown operation is executed to discontinue I/O operations of the respective device.

12. The system of claim 8, wherein each of the identified plurality of device temperature values that are each indicative of the temperature at the respective device of the plurality of devices are based on a plurality of temperature samples obtained from a temperature measurement device built-in on the respective device.

13. The system of claim 8, wherein the processing device is to perform operations further comprising:
    controlling, based on the composite temperature of the system, an environmental condition of the system by adjusting a fan speed of the system.

14. The system of claim 8, wherein the plurality of device includes a controller, a volatile memory device, and a non-volatile memory device.

15. A non-transitory computer-readable medium comprising instructions that, responsive to execution by a processing device, cause the processing device to perform operations comprising:
    identifying a plurality of device temperature values that are each indicative of a temperature at a respective device of the plurality of devices of a system;
    a normalizing value for each device of the plurality of devices based on a corresponding composite temperature threshold ratio; and
    determining a largest normalized value among the plurality of devices to be set as a composite temperature of the system.

16. The non-transitory computer-readable medium of claim 15, wherein the normalized value is equal to the respective device temperature multiplied by the normalizing value over the maximum temperature of the respective device.

17. The non-transitory computer-readable medium of claim 15, wherein the normalizing value is based on a predetermined temperature in which input/output (I/O) operations of a memory sub-system is discontinued.

18. The non-transitory computer-readable medium of claim 15, wherein the maximum temperature of the respective device is based on a temperature at which a thermal shutdown operation is executed to discontinue I/O operations of the respective device.

19. The non-transitory computer-readable medium of claim 15, wherein each of the identified plurality of device temperature values that are each indicative of the temperature at the respective device of the plurality of devices are based on a plurality of temperature samples obtained from a temperature measurement device built-in on the respective device.

20. The non-transitory computer-readable medium of claim 15, wherein the processing device is caused to perform operations further comprising:
    controlling, based on the composite temperature of the system, an environmental condition of the system by adjusting a fan speed of the system.

* * * * *